Dec. 26, 1950 R. F. SMELTZER 2,535,325

AUTOMATIC VOLUME CONTROL

Filed Feb. 25, 1946

Inventor

RAYMOND F. SMELTZER

By Robert T. Killman

Attorney

Patented Dec. 26, 1950 2,535,325

UNITED STATES PATENT OFFICE 2,535,325

AUTOMATIC VOLUME CONTROL

Raymond F. Smeltzer, Towson, Md., assignor to Bendix Aviation Corporation, Towson, Md., a corporation of Delaware Application February 25, 1946, Serial No. 650,062

3 Claims. (Cl. 179—171)

Figures 1, 2:
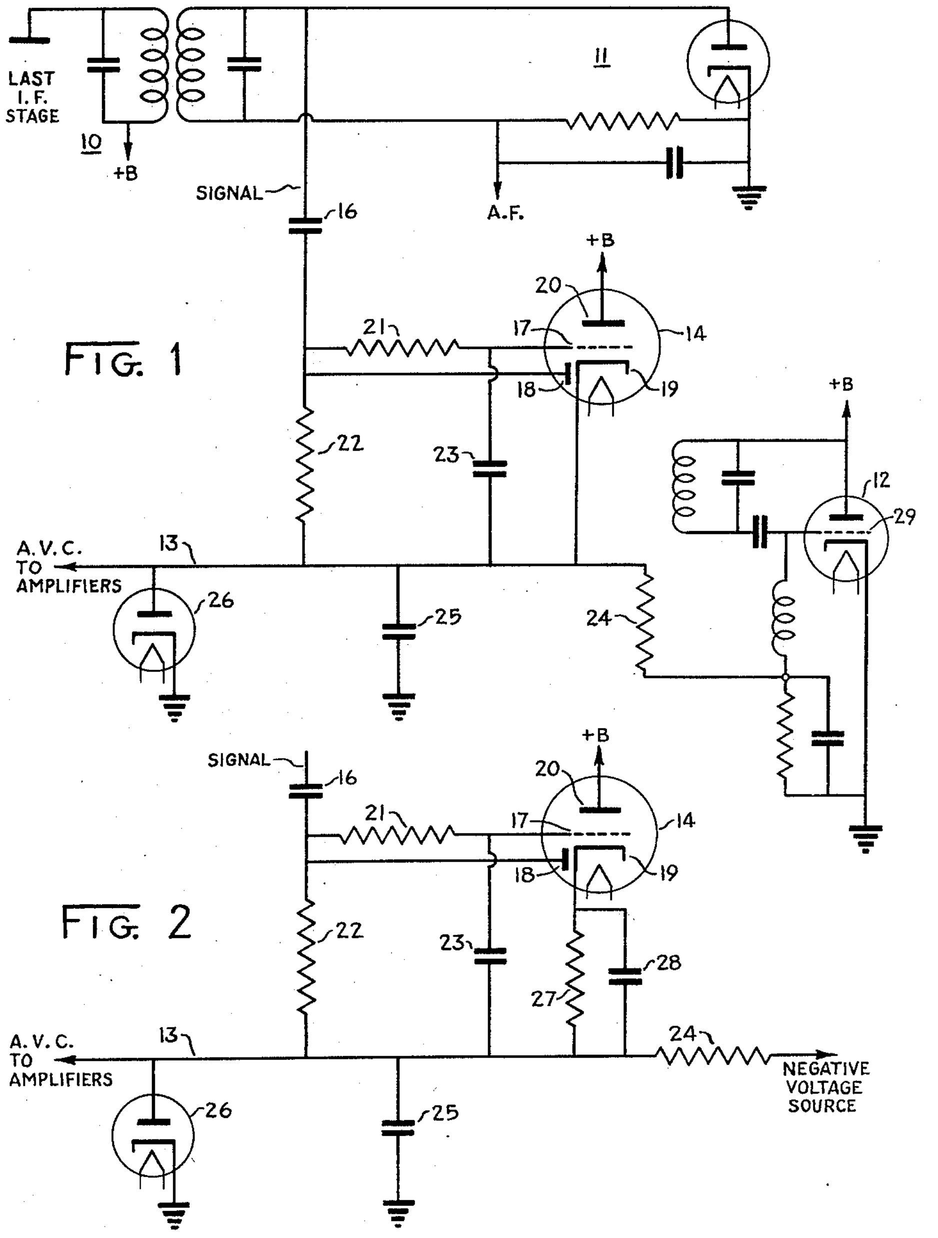

This invention is directed to automatic volume control circuits, and, more specifically, it is directed to A V. C. circuits wherein adidtional amplification is provided in the A. V. C. network over that incorporated in the normal signal channels of the receiver intermediate frequency amplifier system.

Amplified A. V. C., as this type of arrangement is generally known, has, in the past, been obtained either by further amplification of the intermediate frequency signal before application to the A. V. C. rectifier, or by amplification of the D. C. control voltage produced by the A. V. C. rectifier before its application to the controlled stages. The former method, namely, the incorporation of additional amplifier stages at the intermediate frequency, often introduces instability due to the increase in the overall amplification of the I. F. system, and usually causes regeneration, particularly in receivers of moderately priced construction. This regeneration produces many undesirable effects among which are distortion due to the non-linearity of the amplification of regenerative amplifiers, and an excessive narrowing of the band width passed by the system due to the effectively increased Q of the I. F. channel.

The latter method of increasing the available A. V. C. voltage, namely that of including stages of D. C. amplification between the A. V. C. rectifier and controlled stage or stages is generally more satisfactory, but, due to the inherent instability of direct current amplifiers in general, the design and construction of such arrangements requires a degree of precision which renders their use uneconomic.

It is an object of this invention, therefore, to provide an A. V. C. system wherein a greater control effect is obtained with a minimum of instability introduced thereby.

It is a further object of this invention to provide an A. V. C. system which eliminates additional I. F. amplifiers in the A. V. C. channel, and thus minimizes the possibility of the introduction of undesired feedback.

It is a further object of this invention to provide an A. V. C. system which eliminates conventional D. C. amplifiers and their attendant inherent instability.

A further object of this invention is to provide an A. V. C. system which applies the very minimum of load to the signal-translating channels of the system to which it is connected.

A further object of this invention is to eliminate one or more of the shortcomings of the prior-art arrangements.

The above and further objects and novel features will more fully appear from the following detailed description when the same is read in connection with the accompanying drawings. It is to be expressly understood, however, that the drawings are for purposes of illustration only, and are not intended as a definition of the limits of the invention, reference for this purpose being had to the appended claims.

In the drawings,

Figure 1 is a schematic diagram of a circuit constituting an automatic volume control system embodying the invention; and, Figure 2 is a schematic diagram of a portion of the circuit of Figure 1 modified by the addition of means to delay the initiation of the automatic volume control action.

The objects of the invention are accomplished by a system which applies to the automatic volume control bus from a high impedance source a negative potential sufficient to reduce the gain of the receiver to a value suitable for the reception of the strongest signals apt to be encountered. This potential is nullified in the absence of signals above a certain level by the action of a normally conducting control tube. A combination diode-triode tube may be utilized as the control tube, automatic volume control action being obtained by the application of normally amplified signal voltage derived from the audio detector stage of the receiver to a local circuit restricted to the control tube and including the diode section thereof, which rectifies the signal and applies the product to the control grid of the tube to reduce its conduction. An additional feature of the system is the utilization of a resistor in series with the cathode of the control tube, to obtain a self-bias which delays diode rectification until a desired minimum signal level is exceeded, and stabilizes the maximum current through the control tube.

Referring now more particularly to the drawings, the last intermediate frequency stage of a receiver is indicated by a circuit designated by the reference numeral 10. Coupled thereto is a detector stage 11 of the receiver, from which automatic volume control signal input is obtained through a condenser 16. A combination diode-triode control tube 14 is provided, the triode portion having its anode 20 connected to a source of positive potential and its cathode 19 connected to the automatic volume control bus 13.

The bus 13 has applied thereto a potential which is negative with respect to the cathodes of the tubes controlled thereby and probably to the chassis in general, and of sufficient magnitude to reduce the gain of the receiver to a value suitable for the reception of the strongest signal apt to be encountered. This potential is obtained from a source of relatively high impedance, such as an existing diode section of a tube rectifying an alternating potential from the primary source of power; from a local oscillator; or through a high resistance from a normally rectifying tube element, such as the control grid of an oscillator or mixer. The latter type of source is shown here, the bus 13 being shown as connected to the control grid 29 of an oscillator 12 through a high resistance 24. A condenser 25 is connected between the bus 13 and ground for filtering purposes.

The resistance 24 is of sufficient magnitude so that a relatively small current passing through the normally conducting triode section of the control tube 14 will serve to nullify the negative potential applied to the bus 13 in the absence of a signal sufficiently strong to operate the control tube.

The utilization of a high impedance source for this purpose avoids the necessity of adding separate rectifying and filtering means to supply this voltage, thus reducing the expense of automatic volume control.

Signal voltage for volume control purposes is obtained from the detector stage 11 through resistor 21 and is applied to a circuit of which the diode section of tube 14 forms a part and which will now be described.

The anode 18 of this section is connected to the cathode 19 through a resistor 22, and to the grid 17 through a resistor 21. A condenser 23 is connected between the grid 17 and the bus 13. Signal voltage is applied to this circuit across the resistor 22 and is rectified by the circuit comprising the anode 18, resistor 22 and cathode 19. The negative voltage which is a product of this rectification is applied to the grid 17 through the resistor 21, the condenser 23 acting as a filtering means.

By this action the space current flow through the tube 14 will be reduced in accordance with signal strength and the nullifying action exerted by the space current flow, with regard to the negative potential applied to the bus 13, will be varied in an inverse manner. The level of negative voltage available on the bus 13 for volume control will thus vary in accordance with signal strength.

The potential of the bus 13 is prevented from becoming positive in polarity by the use of a diode 26 as a by-pass to ground.

Figure 2 illustrates a modification of the circuit of Figure 1 in which a self-biasing means consisting of a resistor 27 shunted by condenser 28 is inserted in the cathode circuit of the tube 14. The resistor 27 generates a limited amount of self-bias due to space current flow during periods when no signal voltage is being applied to the circuit, thus in effect applying a minimum signal amplitude delay voltage to the tube without making any demand upon signal power. As long as the bias supplied by the resistor 27, between grid 17 and cathode 19, is not exceeded in amplitude by the amplitude of the signal, no rectification will take place and thus no work will be effected by the signal.

When the signal amplitude exceeds the initial delay bias developed acros the cathode resistor 27, rectification through the diode elements 18 and 19 ensues and the bias developed across resistor 22 is applied to the control grid 17 of the triode section as before. However, as the triode space current is reduced by this action, the delay bias is progressively reduced and the difference between the delay bias and the signal amplitude is increased, so as to provide an enhanced bias for the control grid 17. If the initial bias developed across resistor 27 is a fractional part $m/n$ of the cutoff bias of the triode grid 17, no A. V. C. potential is developed until the signal at the diode exceeds this potential, and full A. V. C. potential is developed when the signal attains an amplitude sufficient to develop the cutoff bias of the triode grid 17. The ratio of the maximum signal to the minimum signal capable of developing A. V. C. potential is then $n/m$, as seen at the diode rectifiers. By suitable design all useful signals may be made to fall in this range, and the range may be made as small as may be desired.

In addition to the establishment of a delay voltage the resistor 27 acts to stabilize the maximum current flow through the control tube by means of the generated bias.

While the invention has been disclosed with reference to the embodiments thereof which are now preferred, many changes and modifications falling within the scope of the appended claims will occur to those skilled in the art. It is therefore to be understood that the invention is not to be considered as limited to the embodiments disclosed herein.

What is claimed is:

1. In a system for the automatic volume control of a radio receiver: a control channel; a source of negative potential of a magnitude sufficient to provide the maximum desired control action; means applying said negative potential to said channel; a source of positive potential; a control tube comprising an anode, a cathode, and a control grid, said cathode being connected to said control channel and said anode being connected to said source of positive potential; said source of negative potential presenting to said control channel an impedance of such value that normal space current flow through said control tube in the quiescent state thereof will substantially nullify the application of said negative potential to said channel; a second anode in said control tube; a rectifying circuit; means for applying a signal voltage derived from said receiver to said rectifying circuit, said rectifying circuit including said second anode and said cathode; means applying the average product of said rectification to said grid; and self-biasing means for said control tube comprising a resistor in the circuit of said cathode connected between said cathode and said channel, and a condenser shunting said resistor, said biasing means establishing a bias on said grid and second anode with respect to said cathode due to grid controlled space current flow and rectification in said control tube.

2. In a system for the automatic volume control of a radio receiver: a control channel; a voltage source applying to said control channel a negative potential of a magnitude sufficient to provide the maximum desired control action; a source of positive potential; a control tube connected between said source of positive potential and said channel, the first mentioned source presenting to said channel an impedance of such value that normal current flow through said tube in the quiescent state thereof will substantially nullify the application of said negative potential to said channel; a control grid and a cathode in said tube; a rectifying circuit; means applying a signal voltage from said receiver to said rectifying circuit; means applying the average output of said rectification to said grid; and resistance-capacitance means connected in series with the path of the total space current of said tube between said cathode and said channel, said resistance-capacitance means applying a bias to said grid and rectifying circuit in response to grid controlled space current flow in said control tube and to the action of said rectifying circuit.

3. In a system for the automatic volume control of a radio receiver: a control channel; a source of negative potential of a magnitude sufficient to provide the maximum desired control action; means applying said negative potential to said channel; a source of positive potential; a control tube comprising an anode, a cathode, and a control grid, said cathode being connected to said control channel and said anode being connected to said source of positive potential, said source of negative potential presenting to said control channel an impedance of such value that normal space current flow through said control tube in the quiescent state thereof will substantially nullify the application of said negative potential to said channel; a rectifying circuit including said cathode and being connected to said control grid; a self-biasing means for said control tube comprising a resistor in the circuit of said cathode connected between said cathode and said channel, and a condenser shunting said resistor, said biasing means establishing a bias on said grid with respect to said cathode due to grid controlled space current flow in said control tube and rectification in said rectifying circuit; and means for applying signal voltage derived from said receiver to said rectifying circuit.

RAYMOND F. SMELTZER.

REFERENCES CITED

The following references are of record in the file of this patent:

UNITED STATES PATENTS

| Number | Name | Date |
|---|---|---|
| 2,207,094 | Getaz | July 9, 1940 |
| 2,207,905 | Weagant | July 16, 1940 |
| 2,255,683 | Singer | Sept. 9, 1941 |
| 2,390,856 | Thompson | Dec. 11, 1945 |
| 2,434,929 | Holland | Jan. 27, 1948 |